Nov. 8, 1966  P. KENT  3,283,783
MULTI-WAY VALVE
Filed Oct. 25, 1963  2 Sheets-Sheet 1
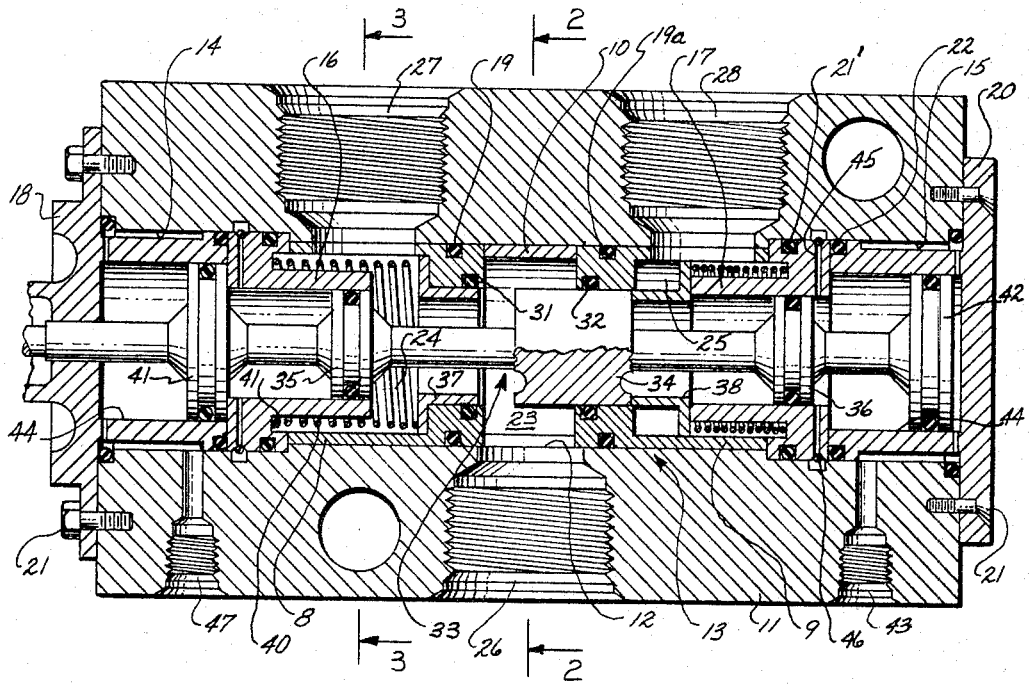
FIG. 1
FIG. 2
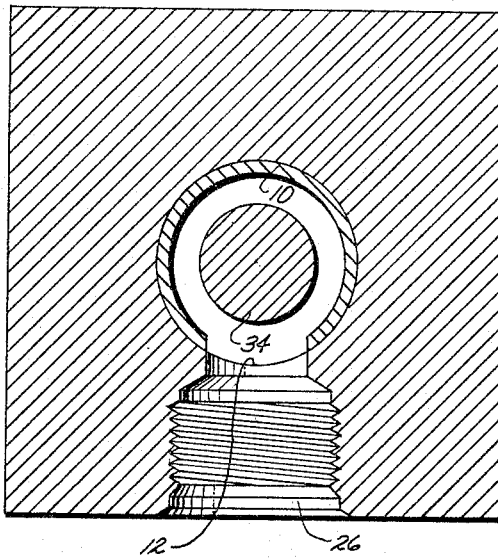
INVENTOR.
PREBEN KENT
BY
ATTORNEY

INVENTOR.
PREBEN KENT

ATTORNEY

United States Patent Office 3,283,783
Patented Nov. 8, 1966

3,283,783
MULTI-WAY VALVE
Preben Kent, Altadena, Calif., assignor to Clary Corporation, San Gabriel, Calif., a corporation of California
Filed Oct. 25, 1963, Ser. No. 318,881
1 Claim. (Cl. 137—625.42)

This invention relates to valves and has particular reference to multi-way valves, such as three-way valves, employed to control fluids under high pressures, on the order of 2,000 pounds per square inch, or more.

Heretofore, difficulty has been encountered in developing multi-way valves capable of handling fluids under high pressures, due to a large extent to problems arising in sealing the valve, in its different conditions, against leakage.

In order to effect a leak-proof seal against high fluid pressures, valves of the above type generally include a relatively soft resilient member, such as an O ring of rubber or the like, which cooperates with a valve member to seal off the fluid. When the valve member is moved to open position, the soft seating member tends to follow, due to the relatively high fluid velocities and forces involved and this often results in tearing the seating member from its anchorage.

The above problem has been solved heretofore, as disclosed in the patent to Hoge, 2,469,921, issued on May 10, 1949, by containing the soft seating member in the form of an O ring or the like totally enclosed in an annular groove by either the valve member itself, when the flow passage is closed, or by a sleeve which directly follows the valve member and slideably engages the seating member, when the flow passage is opened. Although such valve construction appears to work satisfactorily, it requires a relatively large movement of the valve member and, because of its construction, the flow of fluid through the open fluid passage is materially restricted.

Therefore, a principal object of the present invention is to provide a valve of the above type which provides a better flow passage.

Another object is to provide a valve of the above type which enables a shorter travel of the valve member in changing from one flow condition to another.

Another object is to provide a valve of the above type having a non-interflow feature which prevents flow of fluid under pressure from one inlet port to another during shifting of the valve member from one flow controlling position to another.

Another object is to provide a valve of the above type which is held in any of its flow controlling conditions by fluid pressure.

A further object is to provide a valve of the above type which may be used to control the flow of fluid under pressure in either direction.

The manner in which the above and other objects of the invention are accomplished will be readily understood on reference to the following specification when read in conjunction with the accompanying drawings, wherein:

FIG. 1 is a longitudinal sectional view through a three-way valve embodying a preferred form of the present invention.

FIG. 2 is a transverse sectional view taken along the line 2—2 of FIG. 1.

Figure 4:
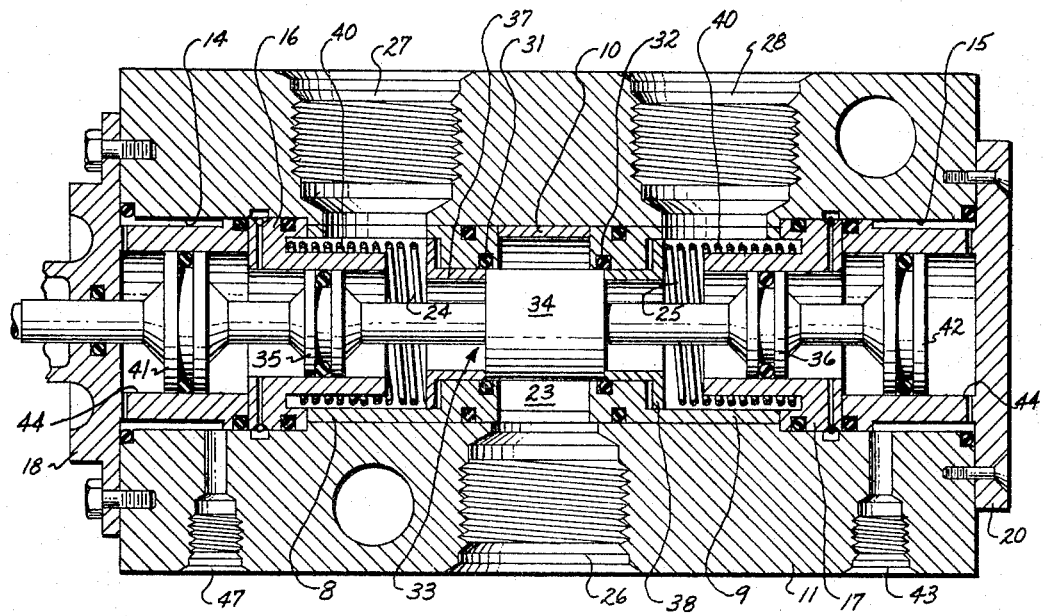
FIG. 4 is a longitudinal sectional view similar to FIG. 1 but illustrating the valve member in a medial position.
Figure 3:
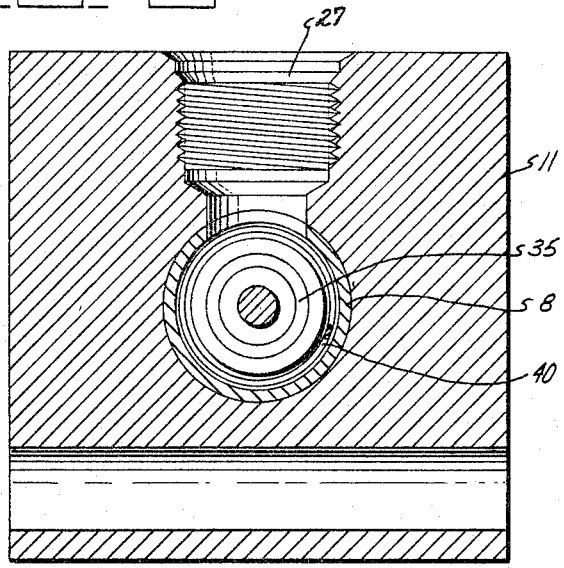
FIG. 3 is a transverse sectional view taken along the line 3—3 of FIG. 1.

Referring to the drawings, the valve comprises a valve body 11 having a longitudinally extending bore 12 formed therethrough to receive a main sleeve device generally indicated at 13. The latter comprises two liner sleeves 8 and 9 located in spaced relation in the bore by a spacer sleeve 10. However, these sleeves could equally well be formed into a single main sleeve. Alternatively, the spacer sleeve 10 could be replaced by a shoulder integral with the body and extending radially inward from the bore 12.

The bore 12 is counter-bored at 14 and 15 at opposite ends to receive retaining sleeves 16 and 17, respectively. The latter sleeves retain the sleeves 8, 9 and 10 in place and are, in turn, held in place by end caps 18 and 20, respectively, which are suitably secured to the ends of the body as by screws 21.

O rings 19 and 19a of rubber, neoprene or other elastomeric material are fitted in annular grooves formed in the outer peripheries of the sleeves 8 and 9, respectively, to prevent leakage along the central portion of the bore 12. Similar O rings, i.e. 21' and 22, are located in grooves formed in the retaining sleeves and end caps to prevent leakage along the counter-bored sections of the main bore.

The main sleeve device 13 is divided into three chambers comprising a central chamber 23 and two end chambers 24 and 25. Ports 26, 27 and 28 are formed coextensively through the body and the main sleeve device 13 to communicate with the respective ones of the chambers 23, 24 and 25.

O rings 31 and 32 of elastomeric material are located in annular grooves formed in a reduced diameter section of the main sleeve device 13 on opposite sides of the central chamber 23.

A slide or valve member, generally indicated at 33, is provided, having a cylindrical central section 34 and cylindrical end sections 35 and 36, the latter being slideably mounted in aligned bores formed in the retainer sleeves 16 and 17 and the former being slideable along the central portion of the main sleeve device 13, into and out of sliding engagement with the O rings 31 and 32.

Flanged sealing sleeves 37 and 38, having the same outer diameters as the central section 34 of the valve member, are slideably mounted in the sleeve device 13 for movement into and out of sliding and sealing engagement with the O rings 31 and 32.

Each of the sleeves 37 and 38 is urged inwardly toward engagement with the respective end of the center section 34 of the valve member and toward a position wherein it is located in sliding engagement with the respective O ring, i.e. 31, by a compression spring 40, extending between the flange of such sleeve and a recessed shoulder 41 formed in the respective retainer sleeve.

It will be noted that when the sleeve 37 is in its position illustrated in FIG. 1, its respective spring 40 will extend across the associated port 27, permitting fluid to pass from the port 27, through the open coils of the spring and through the sleeve 37 to the port 26, or vice versa. Thus, the widely separated coils of the spring offer little resistance to fluid flow therebetween.

It will be further noted that the diameter of the central section 34 of the valve member is slightly larger than the diameters of the end sections 35 and 36 so that fluid under pressure passing between the passages 26 and 27 will hold the valve member in its righthand position illustrated in FIG. 1.

Means are provided to shift the valve member from its righthand position shown in FIG. 1 to an alternate lefthand position wherein the righthand end chamber 25 which previously communicated with the central chamber 23 and the lefthand end chamber 25 is sealed from such communication.

For the purpose of shifting the valve, pistons 42 and 41 are formed on the valve member 33 at its extreme ends and such pistons are slideably fitted in bores 44 formed in the end caps 18 and 20.

In order to shift the valve member into its lefthand position, gas is applied under pressure through coextensive passages 43 to the outer end of the piston 42, causing the valve member to shift to its lefthand position. As the valve member shifts leftward, gas within the bore 44 of the end cap 20, as well as any gas leaking past the piston 42 is displaced by the piston 42 and passes through radial passages 45, past an O ring 46 stretched around a peripheral groove formed in the retainer sleeve 17 and overlying the passages 45. Thus, such displaced air moves past the O ring 46 and into a suitable exhaust passage (not shown) formed in the valve body 11. Similar passages are formed at the lefthand end of the valve body so that gas applied under pressure through a passage 47 to the outer face of piston 41 will shift the valve member back to its righthand position illustrated in FIG. 1.

Describing the operation of the valve, when the valve member 33 is shifted to the left, the center section 34 will engage the sleeve 37, carrying the same with it until the lefthand edge of such center section moves into sliding engagement with the O ring 31. This will occur before the center section leaves sliding engagement with the O ring 32, as shown in FIG. 4, so that interflow of fluid between the ports 27 and 28 is precluded. During this movement, the sleeve 38 will follow the center section 34 under the urge of its spring so as to move into sliding engagement with the O ring 32. Leftward movement of the valve member will continue and after the center section uncovers the central chamber 23 fluid will be allowed to flow between the ports 26 and 28. The valve member will continue its leftward travel until it is arrested by engagement of the sleeve 37 with the righthand end of the retainer sleeve 16. Thereafter, fluid pressure will hold the valve member in its leftmost position.

Since the outer diameter of the center section 34 of the valve member is the same as the outer diameters of the sleeves 37 and 38, the O rings 31 and 32 will always be entirely contained within their annular grooves and therefore cannot be swept downstream due to forces developed by large velocity fluid flow through the valve.

Although the invention has been described in detail and certain specific terms and languages have been used, it is to be understood that the present disclosure is illustrative rather than restrictive and that changes and modifications may be made without departing from the spirit or scope of the invention as set forth in the claim appended hereto. For example, in certain applications it is intended that the center section 34 of the valve member be made slightly longer so that when the latter is in its medial position shown in FIG. 4, it will completely fit over both O rings 31 and 32 to insure sealing against leakage into either of the chambers 24 and 25 when the central chamber 23 is pressurized.

Having thus described the invention, what is desired to be secured by United States Letters Patent is:

A valve comprising
- a valve body having a central chamber and two end chambers,
- said chambers being in alignment with each other,
- fluid ports in said body opening into respective ones of said chambers,
- a first bore communicating said central chamber and a first one of said end chambers,
- a second bore aligned with said first bore and communicating said central chamber and a second one of said end chambers,
- annular grooves in said bores,
- resilient annular sealing members in said grooves,
- sleeves slideable in respective ones of said bores and into and out of sliding engagement with said sealing members,
- a valve member having a cylindrical section of substantially the same diameter as the outer diameters of said sleeves,
- said cylindrical section being located intermediate said sleeves,
- compression springs in said end chambers, said springs being compressed between said sleeves and portions of respective ones of said end chambers for urging said sleeves into sliding engagement with respective ones of said sealing members,
- and means for actuating said valve member in one direction to cause said cylindrical section to move into sliding engagement with a said sealing member in one of said grooves whereby to seal a respective one of said end chambers from communication with said central chamber and to cause said cylindrical section to recede from the other of said sealing members whereby to establish flow connections between the other of said end chambers and said central chamber.

References Cited by the Examiner

UNITED STATES PATENTS

| | | | |
|---|---|---|---|
| 2,469,921 | 5/1949 | Hoge | 137—625.42 |
| 2,771,907 | 11/1956 | Joy | 137—625.48 X |
| 2,982,306 | 5/1962 | Fitzgibbon | 137—625.64 |
| 3,113,591 | 12/1963 | Neuman et al. | 137—627.5 |

M. CARY NELSON, *Primary Examiner.*

HENRY T. KLINKSIEK, *Examiner.*